June 18, 1957  F. KRALL  2,796,452
APPARATUS FOR FUSION OF METALS
Filed July 6, 1956
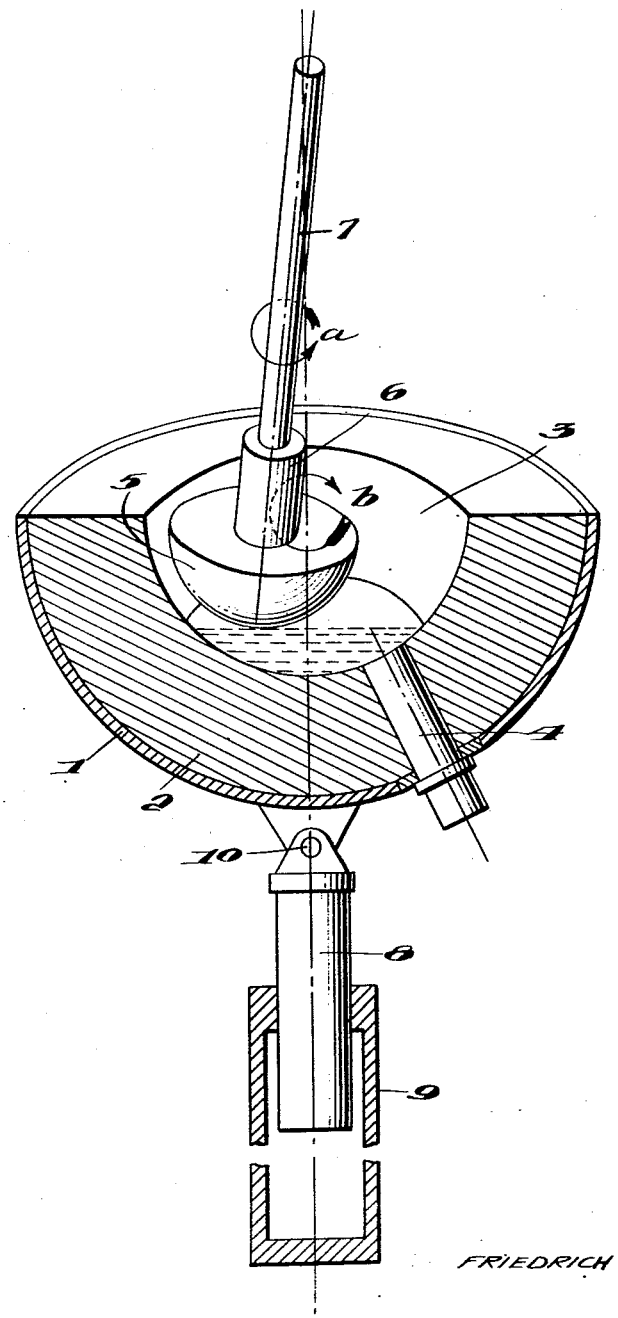
INVENTOR
FRIEDRICH KRALL,
BY Bailey, Stephens & Huettig
ATTORNEYS

United States Patent Office 2,796,452
Patented June 18, 1957

2,796,452

APPARATUS FOR FUSION OF METALS

Friedrich Krall, Hanau, Germany, assignor to Deutsche Gold- und Silber-Scheideanstalt vormals Roessler, Frankfurt, Germany Application July 6, 1956, Serial No. 596,308

Claims priority, application Germany July 6, 1955

8 Claims. (Cl. 13—35)

The present invention relates to improvements in apparatus for the arc fusion of metals, especially titanium, with self consuming electrodes.

Arc furnaces have been employed for the fusion of high melting metals, especially titanium and zirconium. Such arc furnaces are either operated with self consuming electrodes or with arrangements wherein an auxiliary tungsten electrode is employed above the surface of the metal bath. The furnaces with self consuming electrodes are arranged so that the fused metal collects in a water cooled copper tube and, if it is desired, drawn off therefrom. These furnaces are somewhat dangerous to operate in view of the close proximity of the hot fused metal and the cooling water and, furthermore, require careful preforming of the metal which is used as the self consuming electrode. Consequently, for example, it is very difficult to melt or refine loose scrap or in many instances sponges and similar waste products using a self consuming electrode without entailing considerable expense.

Also, furnaces employing auxiliary electrodes which contain the material to be melted in a graphite lined steel trough only operate satisfactorily when the material to be melted is uniformly comminuted to a considerable degree. Furthermore, in operation, one is limited to relatively small units, as the depth of penetration of the arc heat is not very great.

The object of the present invention is to provide an arc furnace structure using self consuming electrodes which, in a simple manner, avoids the aforementioned difficulties and permits high throughputs without special preparation of the metal which is to be melted.

The furnace according to the invention, which is especially suited for the melting of titanium, essentially consists of a melting trough, for example, of steel, which is at least in part lined with the material to be melted in any desired form. The lining for the melting trough is arranged so that a bowl shaped or semi-spherical recess is provided in the center thereof into which at least a part of a moveable electrode projects The lower end of the electrode is provided with a head whose form depends upon the type of metal at hand. For example, a crude titanium sponge, about as is obtained in the Kroll-process, can be used as the head without any further reduction in size. Also, packets of compressed scrap can be employed for the electrode head. The head of the electrode is, for example, welded to one end of a rod or tube of metal, preferably, the same as that of the head, and the other end of the rod or tube is fastened to a suitably cooled electrode holder. The electrode holder is formed of a metal of good electrical conductivity, for example, copper. The connection between the rod or tube carrying the head and the electrode holder can, for example, be a screw threaded joint.

According to the invention, the entire electrode, including the head and the elongated body to which it is attached, is rotatable about its longitudinal axis so that under the influence of the arc the head of the electrode gradually assumes the shape of a body of rotation, and that on the other hand the furnace lining is melted down while maintaining a bowl shaped recess.

According to a further modification of the invention, the electrode is arranged so that it also is adapted to be revolved about the longifitudinal axis of the entire apparatus at a predetermined radial distance therefrom to prevent the melting always occurring at the same height of the melting bowl. The turning radius in such case can be made adjustable so that the enlargement occurring in the bowl shaped recess in the lining of the furnace can be compensated for.

The melting vessel can be stationary so that upon conclusion of the melting process the electrode can be raised to remove it so that the melted metal can be removed. It has, however, been found especially advantageous to mount the melting vessel so that it can be lowered away from the electrode without moving the electrode, preferably with the aid of a hydraulic jack. The hydraulic jack can consist of a cylinder and a piston, the melting vessel being attached to the end of the piston removed from the cylinder. It has furthermore been found expedient to arrange the melting vessel so that it can be tipped to pour out the fused metal charge after it has been lowered away from the electrode.

The lining of the melting vessel can wholly or partly be composed of the metals, such as titanium, to be melted in any desired form, such as scrap or sponge and the like. However, it is also possible to form a part of the lining of ceramic or carbon containing materials, such as graphite or carbides, and only use the metal which is to be fused for the upper layers facing the electrode which form the actual melting bowl in the furnace.

The electric current can be supplied to the furnace lining with the aid of a shaped body such as a massive rod of the metal to be melted which is insulated as it passes through the melting vessel shell. The current supply to the electrode over the cooled electrode holder provides no difficulties.

The accompanying drawing diagrammatically shows a furnace according to the invention.

In the drawing, the melting trough 1, for example, of steel, contains a lining 2, for example, of titanium scrap. The lining 2 is shaped to leave free a recess 3 which forms the actual melting bowl or trough of the furnace. The current for the arc is supplied from the positive pole of the current supply over titanium rod 4. Electrode head 5, also of titanium scrap, is disposed within the melting bowl defined by the inner surface of the lining. Electrode 5 is affixed to rod 6 of massive titanium and the latter is held with electrode holder 7 formed of a good conductive metal, such as copper. The electrode rotates not only as indicated by arrow (a) about its own axis, but also as indicated by arrow (b) revolves within the melting bowl about the longitudinal axis of the apparatus at a predetermined radial distance therefrom. Melting trough 1 is mounted on the top end of piston 8 which can be raised and lowered within cylinder 9 with the aid of a hydraulic fluid to permit raising and lowering of the melting trough. Piston 8 is provided with a releasable pivoted joint 10 which permits tipping of the melting trough after it has been lowered away from the electrode to pour out the molten metal produced.

*Example*

In melting 100 kgs. of titanium and keeping the whole quantity in a liquid state, the melting period should not exceed 10 minutes. Power requirements 900 kilowatts. Current density of the arc of 30 volts requires a current of 30,000 amperes, i. e. a requirement of 1.5 kwh. per 1 kg. of final titanium. The melt was poured into a rectangular ingot mold whereby a salt block was obtained.

The advantages of my invention are the following:

1. One melt only.
2. The specific power requirement runs up to 1.5 kwh./kg. of titanium; whilst the hitherto known technique of a two stage melt required 2.2 kwh./kg. of titanium.
3. The melt may be poured into a mold of any form.
4. The well known danger of water cooled melting troughs is completely avoided.

I claim:

1. In an apparatus for melting metals in an arc with a self consuming electrode, a melting trough at least in part lined with the metal to be melted, means for connecting such lining to a pole of a source of current, said lining being shaped that the inner surfaces thereof define a bowl shaped recess, a moveable electrode provided with a head of the metal to be melted projecting into the recess in the lining, said head being rigidly connected to a conductive metal electrode holder over a massive metal member and said electrode being mounted for rotation about its longitudinal axis.

2. An apparatus according to claim 1 in which said massive metal member over which the electrode head is connected to the electrode holder is composed of the same metal as the electrode head.

3. An apparatus according to claim 1 in which said electrode head is mounted for revolution about the longitudinal axis of the apparatus at a predetermined radial distance therefrom.

4. An apparatus according to claim 3 in which the radius of revolution of said electrode head is adjustable.

5. An apparatus according to claim 1 in which said melting trough is mounted for vertical movement.

6. An apparatus according to claim 1 in which said melting trough is mounted on a pivot to permit tipping of such trough.

7. An apparatus according to claim 1 in which the melting trough is lined with a lining only partly composed of the metal to be melted, the portion of the lining composed of the metal to be melted being adjacent to and defining said recess.

8. An apparatus according to claim 1 in which said means for connecting the lining to the pole of a source of current comprises a shaped body of the metal to be melted which penetrates the melting trough.

References Cited in the file of this patent

UNITED STATES PATENTS

| | | |
|---|---|---|
| 1,220,839 | Gray | Mar. 27, 1917 |
| 1,226,122 | Scott | May 15, 1917 |
| 1,433,404 | Mueller et al. | Oct. 24, 1922 |
| 1,514,918 | Miller | Nov. 11, 1924 |
| 1,917,849 | Northrup | July 11, 1933 |
| 2,133,329 | Moore et al. | Oct. 18, 1933 |
| 2,156,608 | Schon et al. | May 2, 1939 |